(12) United States Patent  
Köckritz et al.

(10) Patent No.: US 8,123,911 B2
(45) Date of Patent: Feb. 28, 2012

(54) PRESS FELT AND METHOD FOR ITS PRODUCTION

(75) Inventors: Uwe Köckritz, Heidenheim (DE); Matthias Schmitt, München (DE)

(73) Assignee: Voith Patent GmbH, Heidenheim (DE)

( * ) Notice: Subject to any disclaimer, the term of this patent is extended or adjusted under 35 U.S.C. 154(b) by 297 days.

(21) Appl. No.: 12/415,342

(22) Filed: Mar. 31, 2009

(65) Prior Publication Data

US 2009/0242159 A1    Oct. 1, 2009

(30) Foreign Application Priority Data

Apr. 1, 2008   (DE) .................. 10 2008 000 915

(51) Int. Cl.
*D21F 7/08* (2006.01)
*B32B 5/00* (2006.01)
*B32B 37/22* (2006.01)

(52) U.S. Cl. ....... 162/358.2; 162/900; 28/142; 156/178; 156/182

(58) Field of Classification Search .................. 162/116, 162/348, 358.1, 358.2, 361, 900–904; 28/110, 28/141, 142; 139/383 AA, 383 A, 425 A; 442/366, 387, 388, 402; 156/166, 176, 178, 156/182

See application file for complete search history.

(56) References Cited

U.S. PATENT DOCUMENTS

| | | | |
|---|---|---|---|
| 3,653,961 A | 4/1972 | Lefkowitz | |
| 3,664,905 A | 5/1972 | Schuster | |
| 4,359,069 A | 11/1982 | Hahn | |
| 4,781,967 A | 11/1988 | Legge et al. | |
| 5,346,567 A | 9/1994 | Barnewell | |
| 6,294,485 B1 | 9/2001 | Hodson et al. | |
| 2004/0005833 A1 | 1/2004 | Best | |
| 2007/0026751 A1 | 2/2007 | Westerkamp | |
| 2007/0235155 A1* | 10/2007 | Best et al. .................. | 162/358.2 |

FOREIGN PATENT DOCUMENTS

| | | |
|---|---|---|
| EP | 1837440 A1 | 9/2007 |
| GB | 1058616 | 2/1967 |
| WO | 8903300 A1 | 4/1989 |
| WO | 9714846 A1 | 4/1997 |
| WO | 9941447 A1 | 8/1999 |

OTHER PUBLICATIONS

Office Action dated Jun. 3, 2008 of U.S. Appl. No. 11/494,324. Office Action dated Jan. 21, 2009 of U.S. Appl. No. 11/494,324.
European Patent Office documents dated Jun. 2009 (8 pages).

* cited by examiner

*Primary Examiner* — Eric Hug
(74) *Attorney, Agent, or Firm* — Taylor IP, P.C.

(57) ABSTRACT

The invention relates to a felt belt, especially a press felt for a paper—, cardboard or tissue machine, with a basic structure that is formed by (a) a longitudinal reinforcement module extending on the width and length of the felt belt, including (1) a laid longitudinal thread structure on the width and the length of the felt belt which is formed by at least one longitudinal thread extending essentially in longitudinal direction of the belt, and (2) one carrying layer which is bonded with the laid longitudinal thread structure and extends on the width and the length of the felt belt, as well as (b) one cross reinforcement module which has the same length and width as the felt belt which is located on and bonded with the longitudinal reinforcement module which is formed by a plurality of cross reinforcement module segments, each of which extend on the width of the felt belt, and only on part of the length of the felt belt and which are arranged in tandem in longitudinal direction of the felt belt and which together complete the length of the felt belt, whereby each cross reinforcement segment includes a group of first threads and a group of second threads, whereby the first and the second threads cross each other at thread crossing points and together form a textile surface structure.

40 Claims, 5 Drawing Sheets

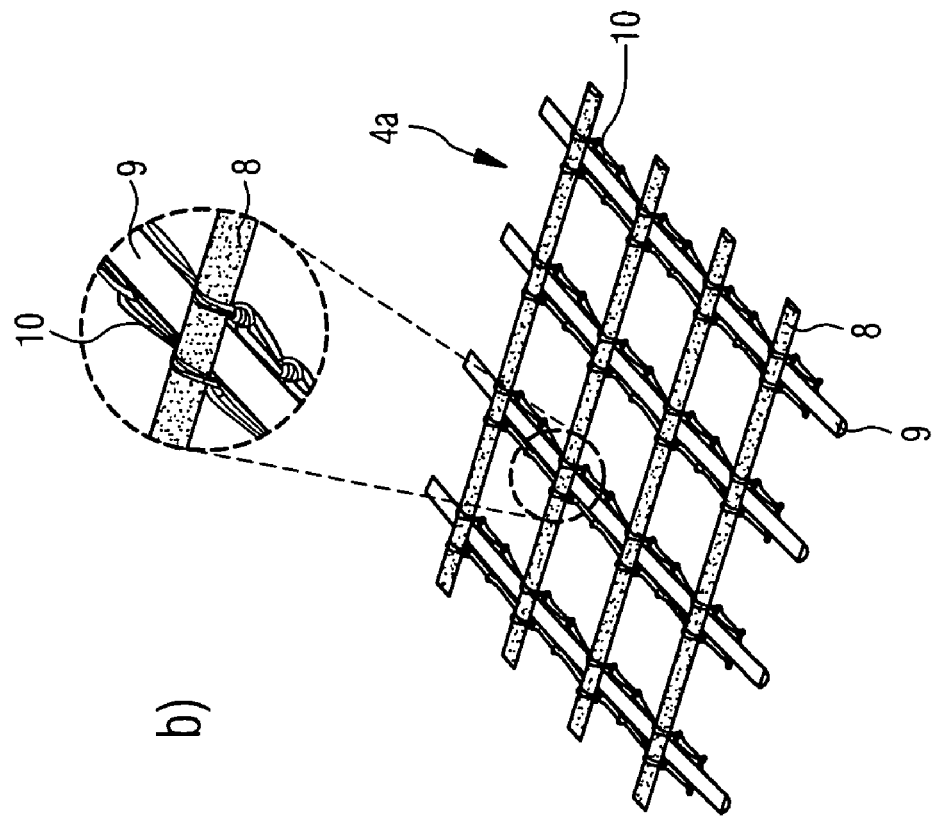
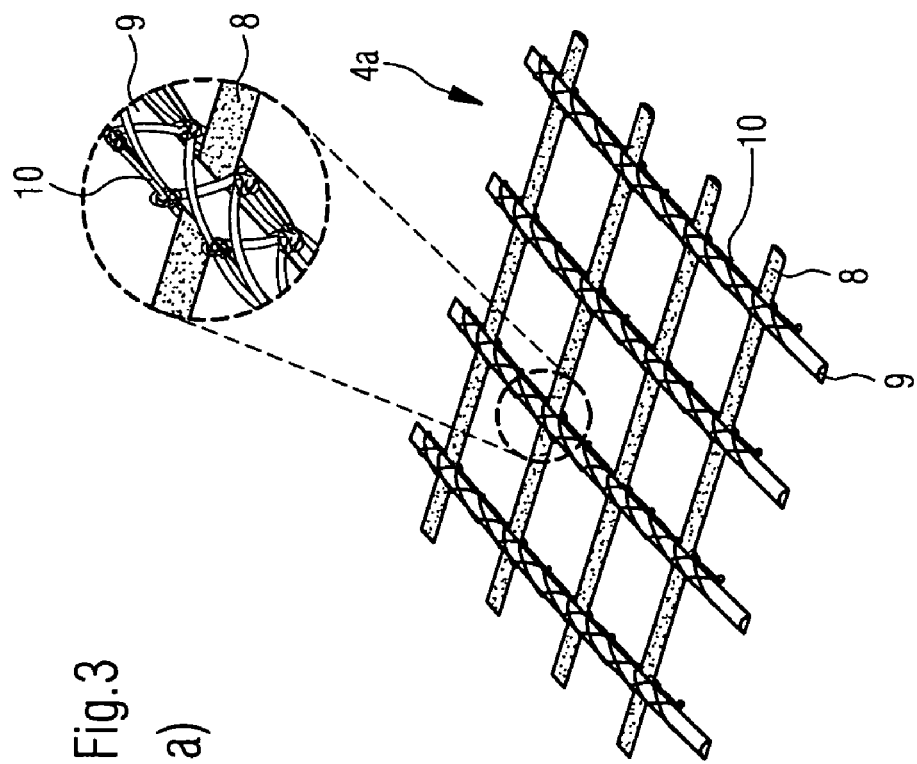
Fig. 3

PRESS FELT AND METHOD FOR ITS PRODUCTION

BACKGROUND OF THE INVENTION

1. Field of the Invention

The invention relates to a felt belt, especially a press felt for a paper—, cardboard- or tissue machine.

2. Description of the Related Art

Felt belts, especially press felts for paper—, cardboard- or tissue machines normally include a basic structure which provides the dimensional stability of the felt, and which is furnished with one or more fibrous nonwoven layers.

In the past the objective in the development of new press felts was oftentimes to replace the felt belts through a modular composition of individual components and to thereby replace the woven structures.

WO89/03300 for example shows felt belts composed of modules. Here, modules are suggested which consist of a laid structure of longitudinal threads which is bonded with one fibrous nonwoven layer, and also of modules which consist of a laid structure of cross threads which is bonded with one fibrous nonwoven layer.

In order to simplify the production of modular press felts of this type it is further suggested in EP 1837440A1 to produce the tensile load absorbing longitudinal reinforcement module from a laid structure of longitudinal threads which is bonded with a fibrous nonwoven layer in one winding process, and to construct the cross-reinforcement module which is used to increase the transverse stability from several cross-reinforcement module segments which extend only along part of the length of the press felt and which are produced in a first manufacturing step, also through a winding process like the longitudinal reinforcement module and which, in a subsequent manufacturing step are trimmed to the width of the press felt that is to be produced, and are oriented with their threads transversely to the laid structure of longitudinal threads, and arranged in tandem in longitudinal direction of the felt.

The known modular press felt concepts consist of laid structures of longitudinal threads and of laid structures of cross threads, whereby the two laid structures are bonded with each other through only one fibrous nonwoven layer. A disadvantage of these structures is that such laid structures often only provide a very limited internal volume in the press felt. Also, since the laid structures of longitudinal and cross threads can move against each other they move aside for each other when running through the press nip, which can lead to a further reduction of the internal hollow space volume and consequently to a reduction in the water absorption capacity.

What is needed in the art are press felts in which the aforementioned disadvantages no longer occur and which, in addition are cheaper to produce than the press felts which are known from the current state of the art.

SUMMARY OF THE INVENTION

The present invention provides a felt belt, especially a press felt for a paper—, cardboard or tissue machine with a basic structure that is formed by a longitudinal reinforcement module extending on the width and length of the felt belt, and a cross reinforcement module located on, and bonded with the longitudinal reinforcement module which also extends on the width and length of the felt belt. With the inventive felt belt the longitudinal reinforcement module includes a laid longitudinal thread structure (which can be referred to as a laid yarn structure) on the width and the length of the felt belt which is formed by at least one longitudinal thread (which can be referred to as a longitudinal yarn) extending essentially in longitudinal direction of the belt to form a yarn layer, as well as one carrying layer which is bonded with the laid longitudinal thread structure and extends on the width of the felt belt. In the inventive felt belt the cross reinforcement module is formed by a plurality of cross reinforcement module segments, each of which extend on the width and length of the felt belt, and only on part of the length of the felt belt and which are arranged in tandem in longitudinal direction of the felt belt and which together complete the length of the felt belt.

The inventive felt belt is characterized in that each cross reinforcement segment includes a group of first threads and a group of second threads, whereby the first and the second threads cross each other at thread crossing points and together form a textile surface structure.

In the inventive modular felt belt the cross reinforcement module therefore includes one mesh-type flat textile structure formed of first threads and second threads which cross over the first threads. The mesh-type textile surface structure clearly provides a greater open hollow space volume on the interior of the mesh loops than in a conventional and known laid structure of cross threads.

Based on the fact that the first threads and the second threads hold each other in position during the formation of a textile surface structure, the threads of the cross reinforcement layer having to move aside for each other is clearly obviated, resulting in that the internal hollow space volume of the press felt can be maintained also when running through a press nip.

In addition, the mesh-type textile surface structure consisting of the first and the second threads can simply be produced, for example as a conventional woven fabric or knitted fabric or leno fabric and does not have to be bonded by a nonwoven layer, like the laid thread structure does.

In the context of the current invention the term "that the longitudinal thread or respectively, threads extend essentially in longitudinal direction of the belt" is to be understood that the longitudinal thread or respectively threads of the laid structure of longitudinal threads, and the longitudinal direction of the felt belt together form an angle of max. 10°, especially max. 5°.

A textile surface structure is to be understood to be a predominantly self-supporting textile structure which is flat, in other words whose length and width is clearly greater than its height. It is also feasible in this context that the width and length are greater by a factor of 100, especially greater by a factor of 1000 than the height.

If the laid thread structure is formed by only one single longitudinal thread then this thread extends essentially in the provided longitudinal direction of the felt belt and can be spiral wound in the direction of the provided width of the felt belt, progressively up to the provided width of the felt belt. By spiral winding of the longitudinal thread, a laid longitudinal thread structure can be formed, whereby each winding of the longitudinal thread extends parallel to the previously and subsequently wound longitudinal thread.

If the laid thread structure is formed from several longitudinal threads, that is of a group of threads, then the individual longitudinal threads extend essentially in the provided longitudinal direction of the felt belt and are located adjacent to each other in the direction of the designate width of the felt belt. Here, the arrangement of the longitudinal threads in the direction of the provided width of the felt belt can be spiral wound in the direction of the provided width, progressively up to the provided width of the felt belt. By spiral winding of the longitudinal thread arrangement a laid longitudinal thread structure can be formed, whereby all longitudinal threads in the arrangement all run parallel to each other and whereby each winding of each longitudinal thread extends parallel to the previously and subsequently wound longitudinal thread.

An additional embodiment of the invention provides that the first threads extend parallel to each other and/or that the second threads extend parallel to each other.

It is also conceivable that the textile surface structure is formed only by the first and the second threads.

The longitudinal reinforcement module is preferably produced in the embodiment of an endless belt.

A tangible embodiment of the invention provides for example that the carrier layer is formed alone, or in combination: by a fibrous nonwoven layer, a foil layer.

A tangible further development of the invention provides that the cross reinforcement module is located on and bonded with the carrier layer of the longitudinal reinforcement module. In this instance the carrier layer can, for example, be structured accordingly so that it can easily be bonded with the cross reinforcement module. It is for example conceivable in this context that the fibrous nonwoven layer includes melding fibers, so that the cross reinforcement module can be conglutinated with the carrier layer of the longitudinal reinforcement module through heat effect. Of course, other bonding methods are also feasible. It is for example conceivable that the cross reinforcement module segments are joined with the longitudinal reinforcement module by being sewn together and/or welded together.

The laid structure of longitudinal threads is preferably embedded in the fibrous nonwoven layer. This may be achieved for example through needle bonding of the laid longitudinal thread structure with the carrier layer which is in the form of a fibrous nonwoven layer. It is possible that the needle bonding process extensively destroys the carrier layer. In this instance the carrier layer can essentially assume the task of holding the longitudinal threads of the laid longitudinal thread structure in position during the further production process of the felt belt.

Each cross reinforcement module segment has two cross edges extending transversely to the longitudinal direction of the felt belt which limit the expansion of each cross modulereinforcement segment in longitudinal direction of the felt belt. The cross edges may progress straight or kinked or curved.

If the cross reinforcement module segments consist only of the first and the second threads, then the cross edges are determined only by the appropriate cutting of the first and second threads, and represent the connecting line of cut off consecutive thread ends.

The cross reinforcement module in the inventive felt belt is composed of the cross reinforcement module segments which are arranged in tandem in longitudinal direction of the felt belt. According to a first embodiment it is possible that the cross edges of cross reinforcement module segments which are located adjacent to each other abut each other. It is however also conceivable that adjacent cross reinforcement module segments overlap in the area of the cross edges.

The cross reinforcement module segments can be cut so that the cross edges extend vertical to the longitudinal direction of the felt belt. It is however also conceivable that the cross edges form an angle in the range of 1°-89° with the longitudinal direction of the felt belt, especially in the range of 20°-70°. In this instance the cross edges of the cross reinforcement module segments progress diagonally to the longitudinal direction of the felt belt, thereby extending for example the abutting edge or respectively, the overlap area of adjacent cross reinforcing module segments in a simple manner. In this connection it is also conceivable that the cross edges of adjacent cross reinforcement module segments are conglutinated and/or welded and/or sewn to each other.

With the inventive solution it is possible that the cross reinforcement module provides reinforcement of the felt belt in cross direction, in other words in the direction of the width of the felt belt as well as also in longitudinal direction of the felt belt. Here, it is for example conceivable that the first group of threads forms an angle in the range of 1° to 90° with the second group of threads.

In addition it can be advantageous in this context if the first group of threads and/or the second group of threads form an angle in the range of 1° to 90°, especially in the range of $45°±10°$ with the longitudinal direction of the belt.

It is conceivable in this context for example that the group of the first threads progress symmetrically relative to the group of second threads with regard to the longitudinal direction of the belt. For example, the first threads form an angle of 90° with the second threads, whereby the first and the second threads respectively form an angle of 45° with the longitudinal direction of the belt. It is also conceivable that the first and the second threads form the same angle in longitudinal direction of the belt, which varies from 45°.

In order to achieve or support holding the first and the second threads of the mesh-type textile surface structure in place it can be advantageous if the first group of threads and the second group of threads are connected with each other at the thread crossing points. This can improve the dimensional stability of the cross reinforcement module and thereby of the entire felt belt.

A connection can for example be achieved in that the first group of threads is conglutinated and/or welded together with the second group of threads at the thread crossing points.

In addition it is conceivable that the group of the first threads is connected with the group of the second threads at the thread crossing points in that the arrangement of first and second threads is coated with a coating at least at the thread crossing points.

In addition, or alternatively it is conceivable that the first group of threads is tacked onto the second group of threads at the thread crossing points through at least one sewing thread. In the latter case, the cross reinforcement module segments can be formed for example by a leno fabric or a knitted fabric, especially a warp knit fabric.

The first and second threads which form the mesh-type textile surface structure can however also hold each other in position in that the first group of threads is interwoven with the second group of threads. The interweaving can also occur alternatively or in addition to the conglutination and/or melding of the threads at the thread crossing points.

The formation of the mesh-type textile surface structure by way of conglutination and/or welding and/or connection by way of an additional sewing thread has the advantage in contrast to a conventional woven structure that the first and the second threads do not progress curved. This means that for the formation of the mesh-type textile surface structure lesser thread material is necessary per surface unit which would have to move aside under a pressure load in the press nip and could thereby clog up the openings in the mesh-type textile surface structure. This means that, for example when connecting the first and second threads by way of a sewing thread, the internal hollow space volume of the felt belt can be maintained better when running through a press nip as compared to a conventional woven structure. This creates a clearly improved dewatering capacity of a felt belt produced in this manner.

In order to reduce the tendency toward marking it can be advantageous if the threads of the first and/or second group of threads are flat threads. A reduction in the tendency toward marking occurs also due to the fact that the pressure force in the press nip distributes itself across a larger thread surface, thereby reducing or preventing a "strike-through" of the first and/or second threads on the paper side of the felt belt when running through the press nip.

In the context of the current invention "flat threads" are to be understood to be predominantly threads whose cross sections have a smaller maximum height than maximum width. In this context threads are also conceivable which have a rectangular or oval cross section.

Since the additional sewing thread fulfils the basic function of holding the first threads to the second threads and other than that should preferably not contribute to the structure of the textile surface structure it is advantageous if the sewing thread is thinner than the first and second threads.

It is especially conceivable in this context that the first threads are essentially of the same thickness as the second threads.

It is conceivable that the first threads, the second threads and the at least one sewing thread are monofilament threads or multifilament threads. In the case of multifilament threads they can be twisted around each other.

Trials undertaken by the applicant have shown that the internal hollow space volume of the felt belt can be maintained to a great extent when running through a press nip, especially when the mesh-type textile surface structure has an open area in the range of 20% to 95% of the vertical projection of the total area of the textile surface structure.

For easier handling of the produced cross reinforcement module segments one variation of the invention also provides that each cross reinforcement module segments extends between 0.5 to 8 meters in longitudinal direction of the felt belt.

A tangible further development of the invention provides that at least one fibrous layer is provided on the side of the basic structure facing the paper side and/or the machine side.

According to a second aspect of the invention a method for the production of a felt belt, especially a press felt for a paper machine, including the following steps is suggested:

a) Provision of a laid structure of longitudinal threads extending on the width and the length of the felt belt that is to be produced, which is formed by at least one longitudinal thread extending essentially in longitudinal direction of the belt;

b) Provision of a carrier layer extending on the width and the length of the felt belt that is to be produced;

c) Connecting of the laid structure of longitudinal threads with the carrier layer in order to form a longitudinal reinforcement module;

d) Provision of a plurality of planiform cross reinforcement module segments whose extension in one direction corresponds with at least the width of the felt belt that is to be produced and that in a vertical direction corresponds to only one part of the length of the felt belt that is to be produced; and arranging of the cross reinforcement module segments on the longitudinal reinforcement module, especially on the carrier layer of the longitudinal reinforcement module, so that the cross reinforcement module segments extend on the width of the felt belt and only on part of the length of the felt belt, and are arranged in tandem and together complete the length of the felt belt;

e) Connecting the cross reinforcement module segments with the longitudinal reinforcement module or with the carrier layer.

The inventive method is characterized in that each provided cross reinforcement module segment includes a group of first threads and a group of second threads which cross the first threads and together with them form a mesh-type textile surface structure.

The cross reinforcement module segments are preferably connected with each other at abutting locations or in the overlap area.

It must be noted that the method steps do not necessarily have to be carried out in the above described sequence. It is for example conceivable that the steps d) and e) are carried out before step c). In this scenario the cross reinforcement module segments can first be connected with the carrier layer before the thereby produced arrangement is joined with the laid structure of longitudinal threads. The cross reinforcement module can in this case be produced in roll form.

In this context it is also conceivable that under step d) the cross reinforcement module segments are connected with each other first, for the formation of the cross reinforcement module which extends on the length and the width of the felt belt, before the thereby created cross reinforcement module is arranged on the longitudinal reinforcement module or respectively, on the carrier layer.

An especially preferred variation of the invention provides that the provision of the multitude of cross reinforcement module segments and their placement on the longitudinal reinforcement module includes:

da) the provision of a cross reinforcement module base web with a width and a length;

db) lateral-feeding of the cross reinforcement module web to the longitudinal reinforcement module;

dc) flat placement of the admitted cross reinforcement module base web onto the longitudinal reinforcement module;

dd) separation of the segment of the cross reinforcement module base web that has been placed on the longitudinal reinforcement module from the remaining cross reinforcement module base web, in order to create a cross reinforcement module segment;

de) movement of the longitudinal reinforcement module in its longitudinal direction relative to the cross reinforcement module base web along a path, which essentially is consistent with the width of the cross reinforcement module base web;

df) repeat of steps db) through de) so that the cross reinforcement module sections are arranged in tandem in longitudinal direction of the felt belt.

During the lateral feeding of the cross reinforcement module base web to the longitudinal reinforcement module, the free end of the cross reinforcement module base web is moved from one longitudinal edge of the longitudinal reinforcement module in the direction of the other longitudinal edge, especially up to the other longitudinal edge of the longitudinal reinforcement module.

Through the movement of the longitudinal reinforcement module in its longitudinal direction relative to the cross reinforcement module base web, an area of the longitudinal reinforcement module which is not yet covered by a cross reinforcement module segment is released on which another cross reinforcement module segment can be placed.

This can occur for example, when the free end of the cross reinforcement module base web moves in a direction which progresses in a plane of the longitudinal reinforcement module or in a plane parallel to it, and transversely to the longitudinal direction of the longitudinal reinforcement module.

In this context it is especially advantageous if the cross reinforcement module base web is provided in roll form. It is further conceivable that the steps db) and dc) are carried out simultaneously or following each other.

In addition it is advantageous if the cross reinforcement module base web is led onto the longitudinal reinforcement module to a point that the part of the cross reinforcement module base web which is being placed on the longitudinal reinforcement module extends on the width of the longitudinal reinforcement module.

The laid structure of longitudinal threads can be produced, for example, in that a single longitudinal thread extending in essentially the provided longitudinal direction of the felt belt is spiral wound, progressively in the direction of the provided width of the felt belt, up to the provided width of the felt belt.

The laid structure of longitudinal threads can also be produced, for example in that several longitudinal threads extending in essentially the provided longitudinal direction of the felt belt are arranged adjacent to each other on only a part of the provided width of the felt belt, and in that the arrangement of the threads are spiral wound, progressively in the direction of the provided width of the felt belt, up to the provided width of the felt belt.

The spiral winding of the longitudinal thread or threads can occur, for example in that the longitudinal thread or threads is or are wound around two rolls that are located at a distance from, and parallel to each other.

In addition, the carrier layer can be produced in that a carrier web extending only across a part of the provided overall width of the felt belt is spiral wound, progressively in the direction of the provided width of the felt belt, up to the provided overall width of the felt belt. Here, it is conceivable that during the spiral winding process, edges of the carrier web facing each other are laid abutting each other, or in certain areas overlapping each other.

According to an additional aspect of the invention an additional method for the production of a felt belt, especially a felt belt including the following steps, is suggested:

a) provision of a web-type longitudinal reinforcement module with a length and a width;

b) provision of a cross reinforcement module base web with a length and a width;

c) lateral feeding of the cross reinforcement module base web to the longitudinal reinforcement module;

d) flat placement of the cross-fed cross reinforcement module base web on the longitudinal reinforcement module;

e) separation of the segment of the cross reinforcement module base web that has been placed on the longitudinal reinforcement module from the remaining cross reinforcement module base web, in order to create a cross reinforcement module segment;

f) movement of the longitudinal reinforcement in its longitudinal direction relative to the cross reinforcement module base web along a path, which essentially is consistent with the width of the cross reinforcement module base web;

g) repeat of steps c) through f) so that the cross reinforcement module segments are arranged in tandem in longitudinal direction of the felt belt.

With the inventive method it is easily possible to produce the cross reinforcement module from a web which is supplied in roll form. Thereby, the expensive fabrication of individual cross module reinforcement segments can be eliminated. The inventive method according to this aspect is especially advantageous when a mesh-type textile surface structure which was produced from first and second threads, crossing each other, is used as the cross reinforcement module, since textile surface structures of this type can be purchased as a fabricated bulk product, in roll form.

The method is implemented especially so that in the completed base structure each of the cross reinforcement module segments which are placed on the longitudinal reinforcement module extends in direction of the width of the longitudinal reinforcement module and that the cross reinforcement module segments which are arranged in tandem, together complete the length of the longitudinal reinforcement module.

In both suggested inventive methods the cross reinforcement module segments that are placed on the longitudinal reinforcement module are bonded with the longitudinal reinforcement module.

The bonding of the cross reinforcement module segments with the longitudinal reinforcement module may for example include that the longitudinal reinforcement module and the cross reinforcement module segments together are subjected to a heat treatment. In this context it is conceivable that the longitudinal reinforcement module and the cross reinforcement module segments which are arranged on it are routed together around a heated roll.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is an exploded view of cross reinforcement module segment of the cross reinforcement module shown in FIGS. 1 and 2;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
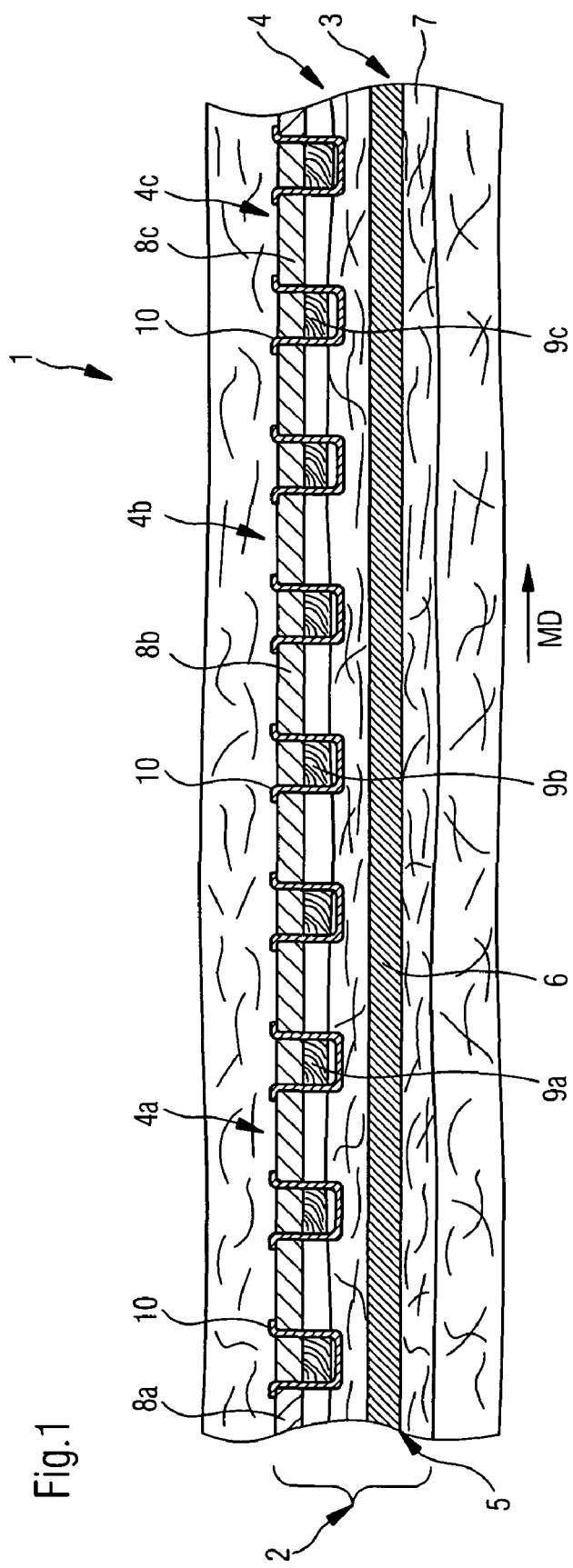
FIG. 1 is a longitudinal sectional view of an inventive felt belt.

Referring now to the drawings, and more particularly to FIG. 1, there is shown a longitudinal sectional view of an inventive felt belt 1. It is to be noted that the longitudinal direction of the felt belt 1 is consistent with the machine direction MD.

The felt belt 1 includes a basic structure 2 which is formed by a longitudinal reinforcement module 3 extending on the width of the felt belt, and including a cross reinforcement module 4, extending on the width of the felt belt.

The longitudinal reinforcement module 3 includes one laid structure of longitudinal threads on the width of the felt belt 1, which is formed from a group of parallel longitudinal threads 6 (only one such thread is recognizable in FIG. 1) which extend essentially in longitudinal MD direction of the belt 1, and including one carrier layer 6 which is bonded with the laid longitudinal thread structure 5 which extends on the width of the felt belt 1. Said carrier layer 6 is predominantly in the embodiment of a fibrous nonwoven layer 7 into which the laid longitudinal thread structure is embedded. The carrier layer 6 includes melding fibers.

The cross reinforcement module 4 is arranged on the longitudinal reinforcement module 3 with which it is conglutinated through the melted and subsequently solidified material of the melding fibers. In the current example the cross reinforcement module 4 is located on the carrier layer 6 of the longitudinal reinforcement module 3 and is bonded with it.

The cross reinforcement module 4 is formed by a plurality of cross reinforcement module segments 4a-4c each of which extend on the width of the felt belt 1 and only along a part of the length of the felt belt 1 and which are located in tandem in longitudinal direction MD of the felt belt 1.

According to the current invention each cross reinforcement module segment 4a-4c is formed from a group of first threads 8a-8c which are located parallel to each other, and a group of second threads 9a-9c which are located parallel to each other and which cross the first threads 8a-8c, so that each cross reinforcement module segment 4a-4c forms a mesh-type textile surface structure. In the current example the first threads 8a-8c extend in longitudinal direction of the felt belt 1 and the second threads at an angle of 90° to them.

As can be seen from the depiction in FIG. 1 the first threads 8a-8c and the second threads 9a-9c are flat threads.

On each cross reinforcement module segment 4a-4c the group of first threads 8a-8c is connected with the group of second threads 9a-9c at the thread crossing points 10 by way of sewing threads 10. The cross section of the sewing threads is thinner than that of the first threads 8a-8c and the second threads 9a-9c.

Furthermore, the first threads 8a-8c have essentially the same size cross section as the second threads 9a-9c. The first and second threads are monofilament threads. In the current example the sewing threads 10 are multifilament threads.

Figure 2:
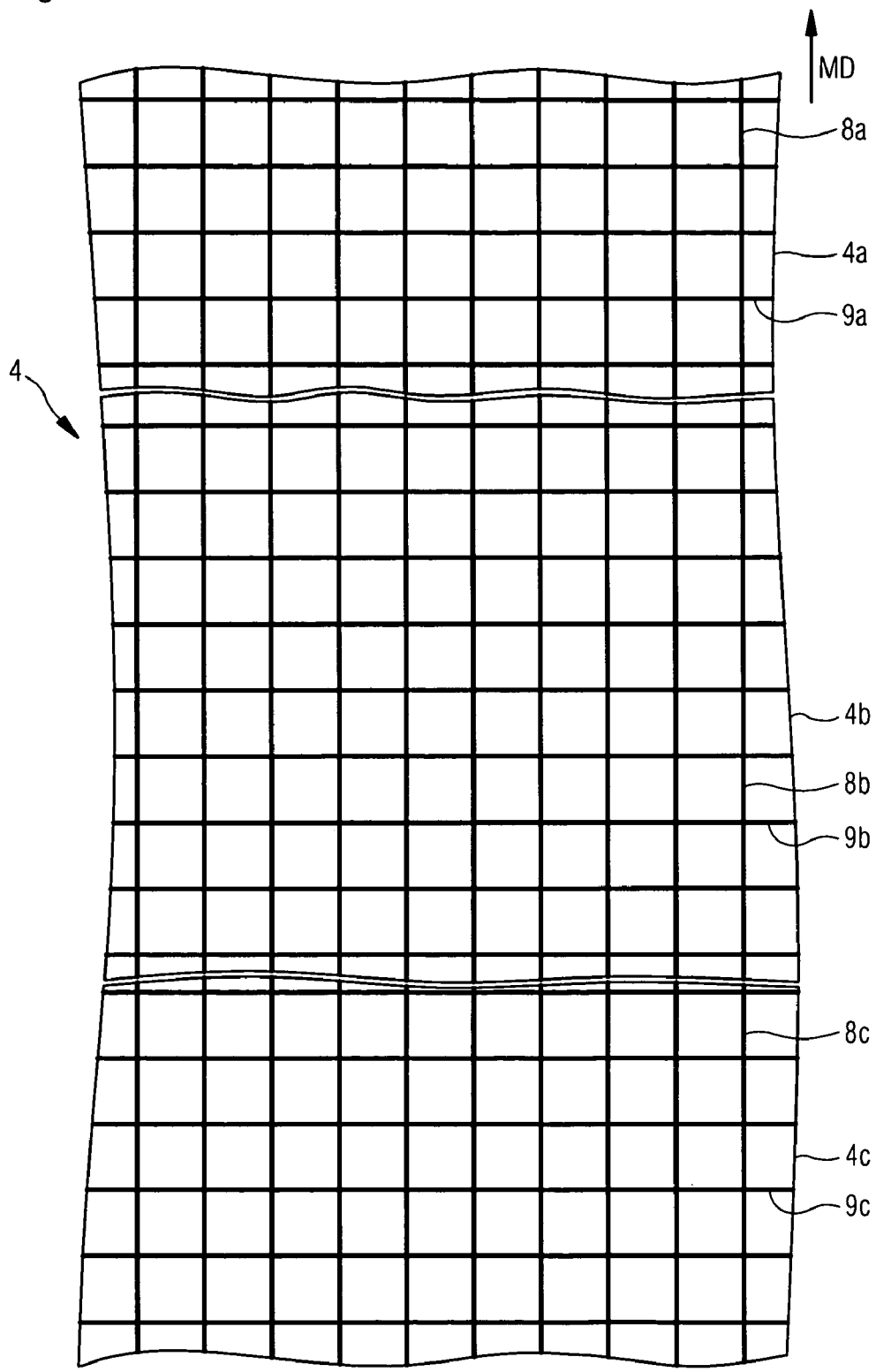
FIG. 2 is a top view of the cross reinforcement module of the felt belt in FIG. 1.

FIG. 2 is a top view of the cross reinforcement module 4 in the area of the three cross reinforcement module segments 4a-4c. The sewing threads connecting the first threads with the second threads are not illustrated in FIG. 2.

In the current example the cross reinforcement module segments 4a-4c which are arranged in tandem in longitudinal direction MD butt against each other. This is achieved in that two ends of first threads 8a-8c pointing toward each other of adjacent cross reinforcement module segments abut each other. For example, the first threads 8a of the cross reinforcement module segment 4a butt against the first threads 8b of the cross reinforcement module segment 4b.

FIG. 3 illustrates the cross reinforcement module segment 4a of the cross reinforcement module 4 in FIGS. 1 and 2 in an exploded view viewed from the top (FIG. 3a) and viewed from the bottom (FIG. 3b). It is to be noted that all cross reinforcement module segments of the cross reinforcement module 4 are constructed like the cross reinforcement module segment 4a. As can be seen from the illustration in FIG. 3, the cross reinforcement module segment is formed by a warp knit fabric in which the first and the second threads are connected with each other through sewing threads 10. In the current example the mesh-type textile surface structure which forms the cross reinforcement module segment 4a has an open area in the range of 20% to 95% of the vertical projection of the overall surface area of the textile surface structure 4a.

Figure 4:
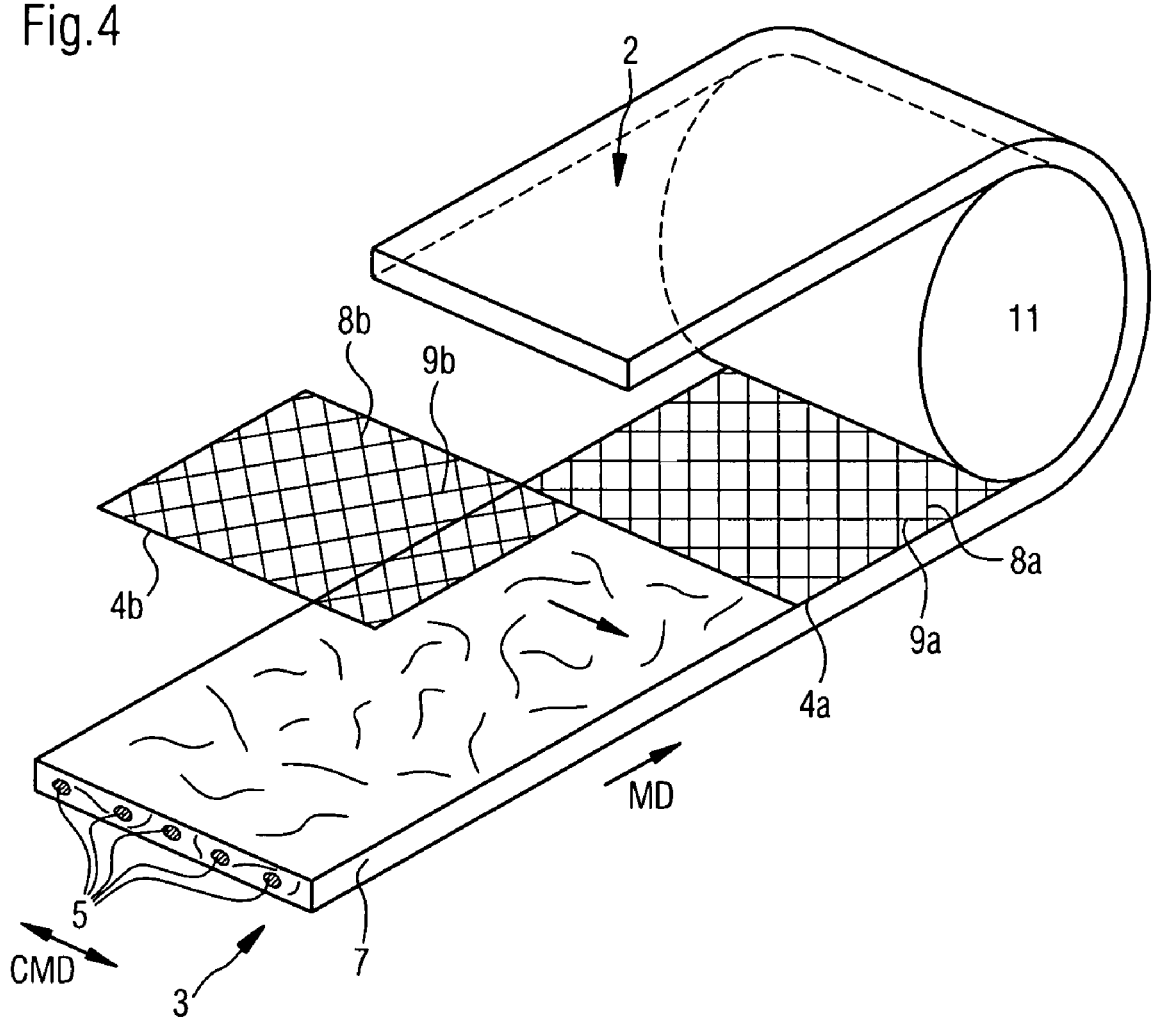
FIG. 4 shows steps of an inventive method for the production of a felt belt.

FIG. 4 illustrates steps of an inventive production method.

It illustrates the already produced longitudinal reinforcement module 3 which includes the fibrous nonwoven layer 7 and the longitudinal threads 6 which are embedded in it.

It illustrates a cross reinforcement module segment 4a which is already placed on the longitudinal reinforcement module 3 and an additional cross reinforcement module segment 4b which is in the process of being placed on the longitudinal reinforcement module 3. The two cross reinforcement module segments 4a, 4b were already trimmed to the correct width, that is to the width of the longitudinal reinforcement module 3, before their placement onto the longitudinal reinforcement module 3. The cross reinforcement module segments 4a, 4b together with additional cross reinforcement module segments which are not illustrated here, form the cross reinforcement module on the longitudinal reinforcement module 3. It applies to all cross reinforcement module segments that their extension in one direction is consistent with at least the width of the felt belt 1 that is to be produced, and, in a vertical direction to same, is consistent only with part of the length of the felt belt 1 that is to be produced.

The cross reinforcement module segments 4a, 4b are arranged on the longitudinal reinforcement module 3 so that they each extend on the width of the felt belt 1 and only along part of the length of the felt belt 1, in the range of 0.5 and 8 m, and so that they are arranged in tandem in longitudinal direction MD of the felt belt 1. After arranging a cross reinforcement module segment 4a, 4b on the longitudinal reinforcement module 3, the cross reinforcement module segments 4a, 4b are bonded with the longitudinal reinforcement module 3. In the current example the bond between the cross reinforcement module segments 4a, 4b and the longitudinal reinforcement module 3 occurs in that the longitudinal reinforcement module 3 and the cross reinforcement module segments 4a, 4b which are located on it are subjected together to a heat treatment in that they are routed together around a heated roll 11. This causes the fibrous nonwoven layer 7 to be conglutinated with the cross reinforcement module segments 4a, 4b because of the melding fibers in the nonwoven layer 7.

It must be noted that the first threads 8 and the second threads 9 of each cross reinforcement module cross at right angles and thereby form an angle of approx. 45° with the longitudinal threads 6 of the laid structure 5 of longitudinal threads.

In order to complete the felt belt, the basic structure 2 created in this manner can subsequently also be provided on one or on both sides with at least one fibrous nonwoven layer.

Figure 5:
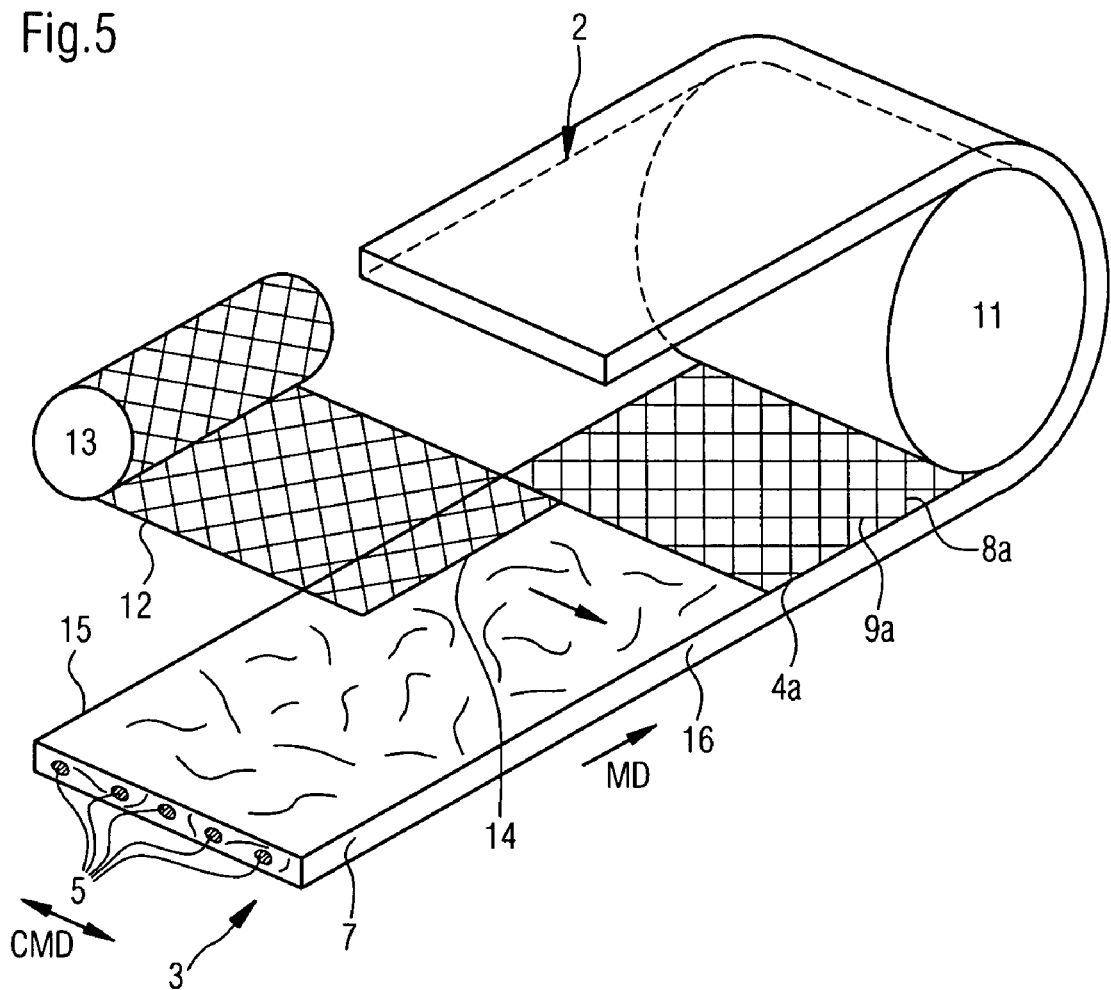
FIG. 5 shows steps of an alternative inventive method for the production of a felt belt.

FIG. 5 illustrates an additional inventive method for the production of a felt belt, especially a felt belt, which includes the following steps.

A web-type longitudinal reinforcement module 3 with a length and a width is provided. In addition, a cross reinforcement module base web 12 with a length and a width which is wound on a roll is provided, and is available as a roll commodity. The cross reinforcement module base web 12 is fed laterally to the longitudinal reinforcement module 3 in that the respective free end 14 of the cross reinforcement module base web 12 is guided from one longitudinal edge 15 of the longitudinal reinforcement module 3 to the other longitudinal edge 16 of the longitudinal reinforcement module 3 (see arrow). After or during feeding, the cross reinforcement module base web 12 is placed on the longitudinal reinforcement module 3. After the placement of the segment of the cross reinforcement module base web 12 on the longitudinal reinforcement module 3 it is severed from the remaining cross reinforcement module base web 12 by creating a cross reinforcement module segment 4a, 4b.

Alternatively, the segment of the cross reinforcement module base web 12 that is to be placed on the longitudinal reinforcement module 3 can already be separated from the remaining cross reinforcement module base web 12 during the placement of the cross reinforcement module base web 12 on the longitudinal reinforcement module 3, in order to create a cross reinforcement module segment 4a, 4b. As can be seen from the illustration in FIG. 5 the cross reinforcement module segments 4a, 4b are cut so that their length is consistent with the width of the longitudinal reinforcement module 3.

In the illustration in FIG. 5, one cross reinforcement module segment 4a has already been placed on the longitudinal reinforcement module 3, according the method described above, while the cross reinforcement module base web 12 is being laterally fed to the longitudinal reinforcement module 3 and being placed on it and is being cut after the placement (not shown), so that the cross reinforcement module segment 4b extends on the width of the longitudinal reinforcement module 3.

After placement of one cross reinforcement module segment 4a on the longitudinal reinforcement module 3, the longitudinal reinforcement module 3 is moved in its longitudinal direction MD, relative to the cross reinforcement module base web 12 along a distance which is essentially consistent with the width of the cross reinforcement module base web 12. Repeating the steps described above causes the cross reinforcement module segments 4a, 4b, . . . to be arranged in tandem in longitudinal direction of the felt belt.

In the current example the method is implemented in a manner, so that in the completed base structure 2 each of the cross reinforcement module segments 4a, 4b that were placed on the longitudinal reinforcement module 3 extend on the width of the longitudinal reinforcement module and so that the cross reinforcement module segments 4a, 4b which are arranged in tandem—together with additional cross reinforcement module segments which are not illustrated here—complete a continuous layer.

As in the method described in FIG. 4, the placed and trimmed cross reinforcement module segments 4a, 4b, . . . are bonded with the longitudinal reinforcement module 3, in that the longitudinal reinforcement module 3 and the cross reinforcement module segments 4a, 4b which are arranged on it are subjected together to a heat treatment in that they are routed together around a heated roll 11.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A belt for one of a paper machine, a cardboard machine, and a tissue machine, said belt comprising:
    a base structure including:
       (a) a longitudinal reinforcement module extending on a width and a length of the belt, said longitudinal reinforcement module including:
          (1) a laid structure of a plurality of longitudinal threads on said width and said length of the belt, said laid structure being formed by at least one said longitudinal thread extending essentially in a longitudinal direction of the belt; and
          (2) one carrier layer which is bonded with said laid structure of said plurality of longitudinal threads and which extends on said width and said length of the belt; and
       (b) a cross reinforcement module having the same said length and said width as the belt, being located on said longitudinal reinforcement module, and being joined with said longitudinal reinforcement module, said cross reinforcement module being formed by a plurality of cross reinforcement module segments each of which extends on said width of the belt and only on a part of said length of the belt, said plurality of cross reinforcement module segments being arranged in series in said longitudinal direction of the belt and together completing said length of the belt, each said cross reinforcement module segment including a plurality of first threads and a plurality of second threads, said first and second threads crossing each other at a plurality of thread crossing points and together forming a mesh-type textile structure.

2. The belt according to claim 1, wherein the belt is a press felt.

3. The belt according to claim 1, wherein said carrier layer is formed by at least one of a fibrous nonwoven layer and a foil layer.

4. The belt according to claim 3, wherein said laid structure of said plurality of longitudinal threads is embedded in said fibrous nonwoven layer.

5. The belt according to claim 3, wherein said fibrous nonwoven layer includes a plurality of meltable fibers.

6. The belt according to claim 1, wherein said plurality of cross reinforcement module segments are joined with said longitudinal reinforcement module by being at least one of conglutinated together, sewn together, and welded together.

7. The belt according to claim 1, wherein said cross reinforcement module is located on said carrier layer of said longitudinal reinforcement module and is bonded with said carrier layer.

8. The belt according to claim 7, wherein said laid structure is needle bonded with said carrier layer which is formed as a fibrous nonwoven layer.

9. The belt according to claim 1, wherein a length of said plurality of cross module reinforcement module segments is limited by a plurality of cross edges progressing transversely to said longitudinal direction of the belt, said plurality of cross reinforcement module segments located in said longitudinal direction in series adjacent to each other overlapping in certain locations in an area of said plurality of cross edges.

10. The belt according to claim 1, wherein a length of said plurality of cross module reinforcement module segments is limited by a plurality of cross edges progressing transversely to said longitudinal direction of the belt, said plurality of cross edges of said plurality of cross reinforcement module segments which are located adjacent and in series to each other abut each other.

11. The belt according to claim 10, wherein said plurality of cross edges extend vertical to said longitudinal direction of the belt.

12. The belt according to claim 10, wherein said plurality of cross edges form an angle in a range of 1°-89° with said longitudinal direction of the belt.

13. The belt according to claim 10, wherein said plurality of cross edges form an angle in a range of 20°-70° with said longitudinal direction of the belt.

14. The belt according to claim 10, wherein said plurality of first threads forms an angle in a range of 1° to 90° with said plurality of second threads.

15. The belt according to claim 1, wherein at least one of said plurality of first threads and said plurality of second plurality of threads form an angle in a range of 1° to 90° with said longitudinal direction of the belt.

16. The belt according to claim 1, wherein said plurality of first threads and said plurality of second threads are connected with each other at said plurality of thread crossing points.

17. The belt according to claim 16, wherein said plurality of first threads are at least one of conglutinated and welded together with said plurality of second threads at said plurality of thread crossing points.

18. The belt according to claim 16, further comprising at least one sewing thread, said plurality of first threads being connected with said plurality of second threads at said plurality of thread crossing points by at least one said sewing thread.

19. The belt according to claim 18, wherein said plurality of cross reinforcement module segments are formed by one of a leno fabric and a knitted fabric.

20. The belt according to claim 19, wherein said knitted fabric is a warp knit fabric.

21. The belt according to claim 1, wherein said plurality of first threads and said plurality of second threads are interwoven.

22. The belt according to claim 1, wherein at least one of said plurality of first threads and said plurality of second threads are flat threads.

23. The belt according to claim 1, further comprising a plurality of sewing threads which are thinner than said plurality of first threads and said plurality of second threads.

24. The belt according to claim 1, wherein said plurality of first threads have essentially the same thickness as said plurality of second threads.

25. The belt according to claim 1, each said cross reinforcement module segment extends in a range of 0.5 to 8 meters in said longitudinal direction of the belt.

26. The belt according to claim 1, wherein said mesh-type textile structure which forms each said cross reinforcement module segment has an open area in a range of 20% to 95% of a vertical projection of an overall surface area of said mesh-type textile structure.

27. The belt according to claim 1, further comprising at least one fibrous layer on a side of said basic structure facing at least one of a paper side and a machine side of the belt.

28. A method for a production of a belt for a paper machine, said method comprising the steps of:
(a) providing a laid structure of a plurality of longitudinal threads extending on a width and a length of the belt that is to be produced, said laid structure being formed by at least one said longitudinal thread extending essentially in a longitudinal direction of the belt;
(b) providing a carrier layer extending on said width and said length of the belt that is to be produced;
c) bonding said laid structure of said plurality of longitudinal threads with said carrier layer to form a longitudinal reinforcement module;
(d) producing a plurality of planiform cross reinforcement module segments whose extension in one direction corresponds with at least said width of the belt that is to be produced and whose extension in a vertical direction corresponds to only one part of said length of the belt that is to be produced;
(e) repeated arranging of said plurality of cross reinforcement module segments which were produced in said step (d) on said longitudinal reinforcement module so that said plurality of cross reinforcement module segments extend on said width of the belt and only on part of said length of the belt, are arranged in series, and together complete said length of the belt; and
(f) bonding said plurality of cross reinforcement module segments with said longitudinal reinforcement module, each said cross reinforcement module segment including a plurality of first thread segments which are located parallel to each other and a plurality of second thread segments which are located parallel to each other and which cross said plurality of first threads and together with said plurality of first threads form a mesh-type textile structure.

29. The method according to claim 28, wherein the belt is a press felt.

30. The method according to claim 28, wherein said laid structure is formed in that said plurality of longitudinal threads extending essentially in said longitudinal direction of the belt are arranged adjacent to each other only on part of said width of the belt and are spiral wound in a direction of said width of the belt progressively up to said width of the belt.

31. The method according to claim 28, wherein said laid structure is formed in that one said longitudinal thread extending essentially in said longitudinal direction of the belt is spiral wound in a direction of said width of the belt progressively up to said width of the belt.

32. The method according to claim 28, wherein said carrier layer is produced in that a carrier web extending only across a part of said width of the belt is spiral wound progressively in a direction of said width of the belt up to said width of the belt.

33. The method according to claim 32, wherein, during a spiral winding process, edges of said carrier web facing each other are laid one of abutting each other and, in certain areas, overlapping each other.

34. The method according to claim 28, wherein said step (f) is implemented in that said longitudinal reinforcement module and said plurality of cross reinforcement module segments together are subjected to a heat treatment.

35. The method according to claim 34, wherein said longitudinal reinforcement module and said plurality of cross reinforcement module segments which are arranged on said longitudinal reinforcement module are routed together around a heated roll.

36. A method for a production of a belt, said method comprising the steps of:
(a) providing a web-type longitudinal reinforcement module with a length and a width;
(b) providing a cross reinforcement module base web with a length and a width;
(c) laterally feeding said cross reinforcement module base web to said longitudinal reinforcement module;
(d) flat placing a cross-fed said cross reinforcement module base web on said longitudinal reinforcement module;
(e) separating a segment of said cross reinforcement module base web that has been placed on said longitudinal reinforcement module from a remaining said cross reinforcement module base web to create a cross reinforcement module segment, said cross reinforcement module segment includes a plurality of first threads and a plurality of second threads, said plurality of first threads and said plurality of second threads crossing each other at a plurality of thread crossing points and together forming a mesh-type textile structure;
(f) moving said longitudinal reinforcement module in a longitudinal direction of said longitudinal reinforcement module relative to said cross reinforcement module base web along a path, which essentially is consistent with said width of said cross reinforcement module base web; and
(g) repeating steps (c) through (f) so that a plurality of cross reinforcement module segments are arranged in series in a longitudinal direction of the belt.

37. The method according to claim 36, wherein in a completed base structure each of said plurality of cross reinforcement module segments which are placed on said longitudinal reinforcement module extends in a direction of said width of said longitudinal reinforcement module and said plurality of cross reinforcement module segments which are arranged in series together complete said length of said longitudinal reinforcement module.

38. The method according to claim 36, wherein said plurality of cross reinforcement module segments are bonded with said longitudinal reinforcement module according to one of step (e) and step (f).

39. The method according to claim 38, wherein said bonding of said plurality of cross reinforcement module segments with said longitudinal reinforcement module occurs in that said longitudinal reinforcement module and said plurality of cross reinforcement module segments arranged on it are subjected together to a heat treatment.

40. The method according to claim 36, wherein said cross reinforcement module base web is in roll form and during a lateral feeding process is wound from said roll.

* * * * *